UNITED STATES PATENT OFFICE.

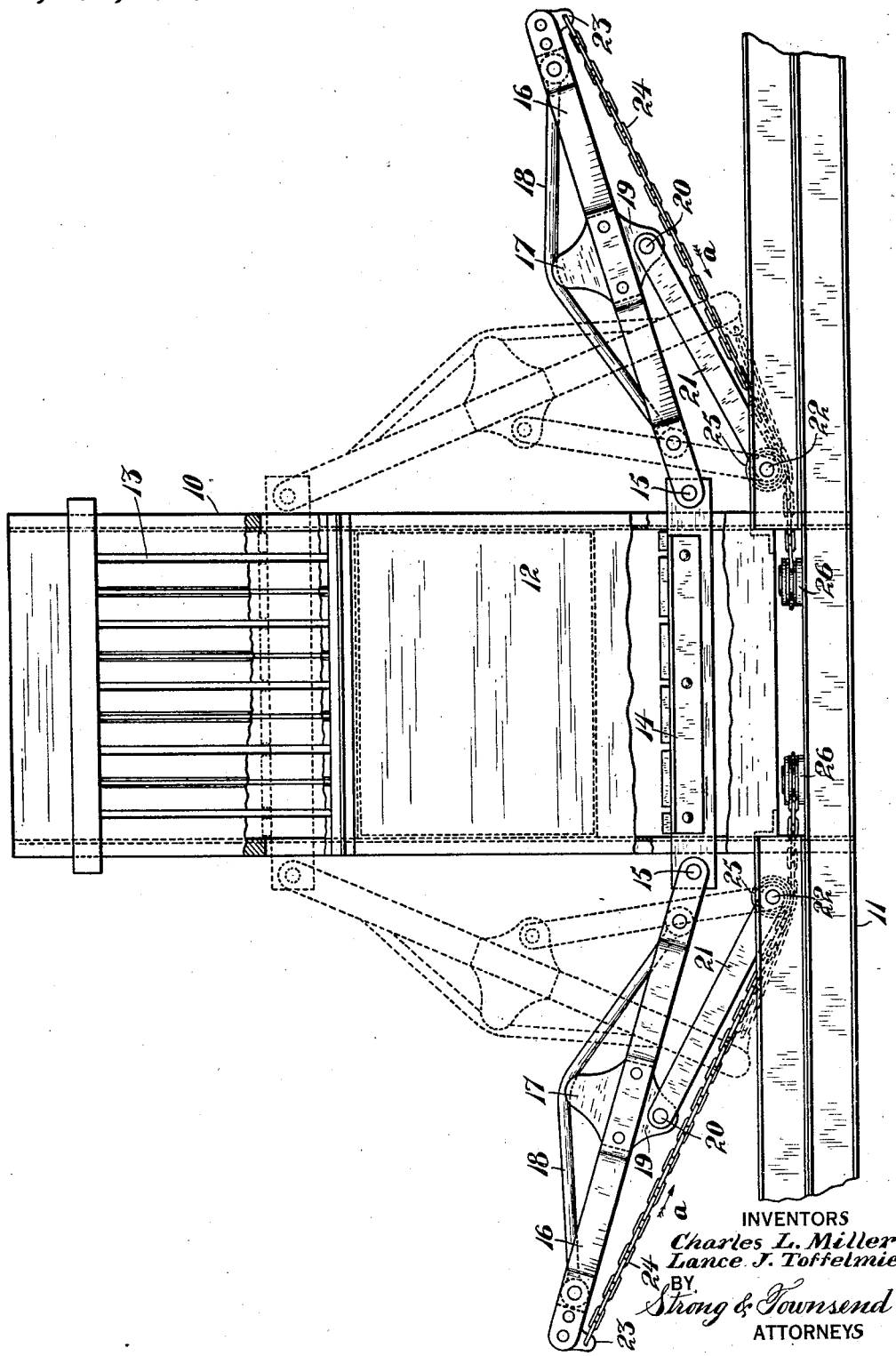

CHARLES L. MILLER AND LANCE J. TOFFELMIER, OF SAN LEANDRO, CALIFORNIA, ASSIGNORS TO JUNIOR MONARCH HAY PRESS CO., OF SAN LEANDRO, CALIFORNIA, A CORPORATION OF CALIFORNIA.

HAY-PRESS.

1,325,306.      Specification of Letters Patent.      Patented Dec. 16, 1919.

Application filed April 7, 1919. Serial No. 288,079.

*To all whom it may concern:*

Be it known that we, CHARLES L. MILLER and LANCE J. TOFFELMIER, citizens of the United States, residing at San Leandro, in the county of Alameda and State of California, have invented new and useful Improvements in Hay-Presses, of which the following is a specification.

This invention relates to a hay press, and particularly pertains to baling means therefor.

Heretofore hay presses have been made embodying the use of a baling chamber into which hay has been fed by a suitable feeding mechanism and is thereafter compressed by a vertically movable follower plate. These follower plates, in most instances, have been elevated by power and are thereafter released to fall by their own weight. This construction has made it necessary to provide various devices for absorbing the shock of the falling follower and has embodied the use of air cushions, coil springs and other structures of like character. These devices have been more or less complicated in their construction and often are out of order, making it necessary to use the hay press without any shock absorbing device at all until repairs can be made by competent persons. The result of this use causes the bottom of the hay press to be destroyed and also produces very objectionable noises during the operation of the machine.

It is the principal object of this invention to provide means embodied in the compression members for the follower plate, which means will act to automatically absorb the shock of the falling follower plate and entirely eliminate the use of supplemental shock absorbers or bumpers.

The present invention contemplates the use of a combined pressing and baling chamber, into which hay is fed and by which it is baled by the compressing action of a follower plate, said member being actuated by a toggle lever mechanism which is so arranged as to absorb the shock of the falling follower.

The invention is illustrated by way of example in the accompanying drawings, in which—

The figure discloses the body portion of a hay press equipped with a follower plate and the operating mechanism with which the present invention is concerned, said drawing indicating the extreme positions of the follower plate by full and dotted lines.

Referring more particularly to the drawings, 10 indicates a combined compressing and baling structure. This structure is here shown as having straight side walls forming a rectangular compartment disposed in a perpendicular position upon sub-frame members 11. The structure 10 comprises a compression chamber 12 at the bottom thereof and a baling chamber 13 at the top thereof. The compression chamber may be constructed in any desired manner; however, we prefer to use a feeding mechanism therefor, similar to that shown in a patent to Charles L. Miller and Lance J. Toffelmier entitled "Baling Press" bearing the number 1,163,250 and issued December 7, 1915.

The feeding mechanism, of course, operates in conjunction with the compression chamber and delivers hay thereto, which is afterward elevated into the baling chamber 13 and compressed by the follower 14. The baling chamber is preferably slatted, so that baling wires may be easily adjusted in position and fastened.

The follower is shown in the drawing as having outwardly projecting arms which extend through vertical slots in the sides of the structure 10. These arms are provided with pressure pins 15, extending through the ends of compression levers 16. One of these levers extends outwardly from each side of the follower and normally stands in the position indicated in full lines in the drawing. The compression levers are suitably reinforced by a king post 17, fixed at a point intermediate the ends of each lever. This post provides a support for a truss rod 18 which is secured by its opposite ends to the ends of the levers. The king posts 17 are formed with downwardly extending brackets 19 carrying fulcrum pins 20. The fulcrum pins provide suitable connection for toggle links 21, which links extend inwardly and downwardly and are pivotally secured to the sub-frame by means of link pins 22.

Attention is particularly directed to the correlation between the pins 15, 20 and 22, as it is this arrangement which makes it possible for the weight of the follower plate to be counterbalanced and its falling movement resisted during operation. Considered horizontally, the pin 22 is spaced outwardly a distance from the vertical transverse axis of the pin 15 and in a horizontal plane therebeneath. This arrangement makes it impossible for the pin 20 to pass the horizontal transverse axis of the pin 15 and produces a peculiar fulcruming action upon the pin 20 which causes the entire weight of the levers 16 to be used as a counterbalance acting from the pin 22 to resist the downward force of the follower 14.

The outer ends of the levers 16 are fitted with lugs 23, to which are secured power chains 24. These chains extend downwardly and pass around pulleys 25 upon a common axis with the pins 22, thereafter being led around idler pulleys 26 and from this to power drums upon which they are wound.

In operation, the compression chamber 12 is suitably filled with hay, after which power is exerted simultaneously upon the chains 24 and will act to draw them both in the direction of the arrows a. This will cause the outer ends of the compression levers 16 to swing downwardly and will at the same time cause the outer ends of the links 21 to swing upwardly. This action will force the inner ends of the compression levers 16 upwardly and will elevate the follower until it assumes the position indicated by dotted lines in the drawing. Due to the toggle arrangement of the links and levers a powerful compressing action will be imparted to the follower to form the hay into a bale.

After the bale has been suitably tied, the application of power to the chains 24 is discontinued and the follower permitted to fall without supporting resistance. As the follower plate is of large dimensions and of considerable weight, it will usually strike the bottom of the structure 10 with great force. For this reason bumper springs and air cushions have been provided to resist the fall of the follower and prevent noise and strain.

In the present instance, however, the members 16 and 21 perform all the functions of a bumper without the use of any additional elements. When the follower 14 begins to fall, the outer ends of the levers 16 will swing outwardly and upwardly and at the same time the levers themselves will move bodily in a downward direction. This downward movement will be performed without restriction until the pins 15 pass the plane of the pins 20. When this has taken place the lever and link structure will begin to swing upon the pins 22. This swinging action will be in an upward direction and, due to the fact that the pins 15 and 22 are out of vertical alinement, the upper ends of the links 21 will be drawn inwardly as the pins 15 move downwardly. This action will produce a counter-movement to throw a counterbalancing weight against the follower and to thus absorb the shock of the fall. When the follower is in this lowermost position rocking pressure on the lever arms may be produced, with the result that the follower will float and will be counterbalanced by the link structure without the use of bumpers or shock-absorbing cushions.

It will thus be seen that the structure here disclosed, while simple in its operation and design, provides means whereby the follower of a hay press may be readily elevated to produce a compression action and may be permitted to fall to its initial position without excessive strains or the production of objectionable noise.

Having thus described our invention, what we claim and desire to secure by Letters Patent is—

1. In a hay press, a movable follower plate, a compression chamber within which said plate is adapted to reciprocate, compression levers pivotally secured to the opposite sides of said plate and by which it is elevated, power means for actuating said levers and supporting elements for the levers, adapted to coöperate with the levers in absorbing the shock of the follower plate as it falls on its return stroke.

2. In a hay press, a vertically disposed baling chamber, a horizontally alined follower plate adapted to be vertically reciprocated within said chamber, compression links pivotally connected to the opposite sides of said follower for elevating the same while maintaining it in its horizontally alined position, power means for simultaneously operating said compression levers and link connections between the compression levers and the main frame of the hay press, whereby the levers will be pivotally supported while elevating the follower and will coöperate with the links while the follower falls from its uppermost position to absorb the shock of the fall.

3. In a hay press, a vertically disposed baling chamber, a horizontally alined follower plate, vertically reciprocable therein, compression levers pivotally connected by their inner ends to the opposite sides of said follower plate for elevating the same, power means applied to the outer ends of said compression levers for producing said elevating action, and fulcrum links pivotally supporting said levers, whereby they will combine with the levers in absorbing the shock of the follower and counterbalancing the same when it reaches the lower end of its stroke.

4. In a hay press, a horizontally alined follower plate, compression levers pivotally secured by their inner ends to the opposite sides of the follower plate, power means connected with the outer ends of said compression levers and adapted to elevate the follower, fulcrum pins fixed in relation to the follower plate and disposed below and out of vertical alinement with the pivotal connections of the follower plate and the compression levers, link members mounted upon said pins and pivot pins pivotally connecting the upper ends of said members with the compression levers at points intermediate their ends.

5. In a hay press, a baling and compression structure, a follower plate therein, means for moving said plate to produce compression of material and to elevate it into the baling chamber, and means whereby said pressure means will act to resist the gravity fall of the follower.

6. In a hay press, a movable follower plate, means for actuating said plate in one direction and for absorbing the force of the movement of said plate in the other direction.

In testimony whereof we have hereunto set our hands in the presence of two subscribing witnesses.

CHARLES L. MILLER.
LANCE J. TOFFELMIER.

Witnesses:
C. KISTLER,
G. W. BAUMBERGER.